(12) United States Patent
Ghostine

(10) Patent No.: US 9,077,583 B2
(45) Date of Patent: Jul. 7, 2015

(54) SYSTEM FOR PROVISIONING, ALLOCATING, AND MANAGING VIRTUAL AND PHYSICAL DESKTOP COMPUTERS IN A NETWORK COMPUTING ENVIRONMENT

(71) Applicant: Dell Software Inc., Aliso Viejo, CA (US)

(72) Inventor: Peter E. Ghostine, Vienna, VA (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/047,562

(22) Filed: Oct. 7, 2013

(65) Prior Publication Data

US 2014/0040354 A1    Feb. 6, 2014

Related U.S. Application Data

(63) Continuation of application No. 12/078,174, filed on Mar. 27, 2008, now Pat. No. 8,560,593.

(51) Int. Cl.
| | |
|---|---|
| *H04L 29/06* | (2006.01) |
| *H04L 29/08* | (2006.01) |
| *H04L 12/58* | (2006.01) |
| *H04W 8/30* | (2009.01) |
| *H04W 48/08* | (2009.01) |
| *H04W 76/00* | (2009.01) |

(52) U.S. Cl.
CPC ........ *H04L 29/06047* (2013.01); *H04L 67/327* (2013.01); *H04L 51/046* (2013.01); *H04W 8/30* (2013.01); *H04W 48/08* (2013.01); *H04W 76/002* (2013.01)

(58) Field of Classification Search
CPC ............................ H04L 51/046; H04L 67/327
USPC .......... 709/223, 224, 203, 213, 217, 219, 229
See application file for complete search history.

(56) References Cited

U.S. PATENT DOCUMENTS

| | | | |
|---|---|---|---|
| 5,553,291 A | | 9/1996 | Tanaka et al. |
| 6,256,637 B1 | | 7/2001 | Venkatesh et al. |
| 6,463,459 B1 | | 10/2002 | Orr et al. |
| 6,496,847 B1 | | 12/2002 | Bugnion et al. |
| 7,653,794 B2 | | 1/2010 | Michael et al. |
| 7,661,027 B2 | | 2/2010 | Langen et al. |
| 8,291,481 B2 | * | 10/2012 | Das et al. ........................ 726/7 |
| 8,732,479 B1 | * | 5/2014 | Henriksen et al. ............ 713/189 |
| 2002/0049810 A1 | * | 4/2002 | Fitzgerald et al. ............ 709/203 |
| 2005/0097166 A1 | * | 5/2005 | Patrick et al. ................. 709/203 |
| 2005/0198303 A1 | | 9/2005 | Knauerhase et al. |

(Continued)

OTHER PUBLICATIONS

International Search Report and Written Opinion from International Patent Appl. No. PCT/US2009/038394, mailed Oct. 6, 2009, in Seven (7) total pages.

*Primary Examiner* — Lashonda Jacobs
(74) *Attorney, Agent, or Firm* — Winstead PC

(57) ABSTRACT

A system for provisioning, allocating, and managing virtual and physical desktop computers in an enterprise network computing environment allows for these physical and desktop computers to be grouped logically based on personnel, organizational, or networking efficiencies without regard to the hardware or server that will ultimately run the virtual machine terminal once it is accessed. A connection broker connects incoming connections to one desktop in a desktop group, based on information relating to that incoming connection.

6 Claims, 11 Drawing Sheets

(56) References Cited

U.S. PATENT DOCUMENTS

| | | |
|---|---|---|
| 2006/0218544 A1 | 9/2006 | Chakraborty et al. |
| 2007/0083501 A1 | 4/2007 | Pedersen et al. |
| 2007/0180448 A1 | 8/2007 | Low et al. |
| 2007/0180493 A1* | 8/2007 | Croft et al. ............ 726/2 |
| 2007/0245409 A1 | 10/2007 | Harris et al. |
| 2007/0255814 A1 | 11/2007 | Green et al. |
| 2008/0060080 A1 | 3/2008 | Lim |
| 2008/0307362 A1* | 12/2008 | Chaudhri et al. ............ 715/835 |
| 2009/0006537 A1* | 1/2009 | Palekar et al. ............ 709/203 |
| 2009/0049174 A1 | 2/2009 | Rudnik |
| 2009/0216975 A1 | 8/2009 | Halperin et al. |
| 2009/0222565 A1 | 9/2009 | Ben-Shachar et al. |
| 2009/0254899 A1 | 10/2009 | Shlomai et al. |
| 2010/0235831 A1 | 9/2010 | Dittmer |

* cited by examiner

SYSTEM FOR PROVISIONING, ALLOCATING, AND MANAGING VIRTUAL AND PHYSICAL DESKTOP COMPUTERS IN A NETWORK COMPUTING ENVIRONMENT

CROSS-REFERENCE TO RELATED APPLICATIONS

This application is a continuation of U.S. patent application Ser. No. 12/078,174, filed on Mar. 27, 2008, now U.S. Pat. No. 8,560,593. U.S. patent application Ser. No. 12/078,174 is hereby incorporated by reference in its entirety.

BACKGROUND OF THE INVENTION

1. Field of the Invention

The present invention relates to systems and methods for provisioning, allocating, and managing virtual and physical machines in a network computing environment.

2. Description of the Related Art

In enterprise computing environments, in which users connect to information systems from a variety of geographically diverse and dispersed environments, it is necessary to standardize the computing environment so that a user working remotely from a home or personal laptop computer is able to access the same applications and network resources as users connecting from the office.

In particular, with the growth in computer services and computer software has come an increased need to allocate and manage computer and software resources effectively and efficiently. As computer software becomes more interoperable and operating systems become more complex, with increased needs for security and reliability, it becomes necessary to find alternatives to having each user with their own computer, whose software and operating system components can become corrupted, unstable, or unreliable.

Corporate and business computer installations throughout the world overwhelmingly use software that runs on the Microsoft Windows family of operating systems. Desktop computers and servers running Windows operating systems are available from a wide variety of vendors and in countless configurations.

In the past, a Windows component, "Terminal Services," enabled users to access applications and data stored on remove computers over standard network connections. A Windows server running the Terminal Services component is referred to as a Windows Terminal Server, or simply, a Terminal Server.

Terminal Server is a Microsoft-specific approach to server-centric computing in that it transforms a Window Server into a mainframe-like multi-user operating system, allowing multiple concurrent users to start an interactive Windows session remotely using a display protocol (also referred to as a "presentation protocol").

In this environment, instead of installing line-of-business applications on every desktop computer in an enterprise, information technology ("IT") departments would deploy these applications to one or more centralized Terminal Servers, and allow users to connect and use these applications using conventional LAN, WAN or Internet networking connections. In addition to its enhanced accessibility features, Terminal Server offers better security than standalone, per-desktop installations. Furthermore, this arrangement makes software upgrades and problem troubleshooting a much easier proposition for technical service personnel.

Terminal Servers provide a number of benefits. Terminal Servers allow for a cluster arrangement, more commonly referred to as a server farm, which can be managed as a single entity.

In addition, the user sessions on the server are brokered using a purpose-built service often known as the "broker" or "connection manager". This service redirects user connections to the most suitable Terminal Server. For an incoming user, if a disconnected session exists on one of the farm servers, the user is reconnected to his/her disconnected session.

Each Terminal Server keeps track of its user sessions, active and disconnected, as well as all the running processes associated with these sessions. User sessions can be remotely controlled for technical assistance purposes, and running processes can be arbitrarily terminated. Idle user sessions can be optionally logged off to reclaim wasted computing resources.

Furthermore, individual applications can be published to the users, allowing the users to remotely start these applications without necessitating an entire desktop session. Finally, remote sessions can be Secure Sockets Sayer (SSL)-protected using a purpose-built SSL VPN (virtual private network).

FIG. 1 illustrates the multi-user computing architecture of Terminal Server referred to in the industry as Presentation Virtualization. In this Figure, numerous users 102 share one operating system 104 and one set of applications 106 installed on the Terminal Services server 100.

Virtual desktop computing is a further extension of the concept of enhancing manageability and efficiency in allocation of computer resources. Virtual desktop computing is a desktop management model that uses virtual machine technology (a.k.a. hypervisor, virtualization software) from vendors like VMware, Virtual Iron, Microsoft, for example, to transform traditional physical desktop computers into centralized virtual resources. By "virtualizing" the physical computer, the entire desktop operating system environment and installed applications, as well as memory and hard disk resources, are encapsulated inside multiple files on the server, collectively constituting a virtual machine (VM). For all practical purposes, a VM is no different than a physical machine in that it has all the required components that make up a full-functional computer. These include a BIOS, a CPU, random access memory (RAM), a network adapter, and a hard disk. From the user's perspective, the VM presents itself and operates like an ordinary physical desktop computer.

Like Terminal Server, Virtual Desktop Computing (VDC) is a server-centric computing model. However, unlike Terminal Server, VDC leverages hardware virtualization technology to transform a physical host into multiple VMs, each running a standard Windows desktop operating system such as Windows XP or Vista. As such, one or more physical hosts running virtualization software are effectively transformed into mainframe-like multi-user systems, allowing each user to interactively connect to a fully-isolated VM using a display protocol.

FIG. 2 illustrates the multi-user computing architecture devised using hardware virtualization. Here, the hypervisor software 202 running on physical servers 200 manages a number of virtual machines 204. In this example, four VMs are shown, but the number can vary greatly. Each VM 204 has its own virtual operating system and application set which are encapsulated as files on the servers 200, and which are managed by the hypervisor program.

PC Blades offer a third approach to desktop computer consolidation. Mounds of traditional desktop computers geographically dispersed throughout the enterprise are effectively replaced with centralized PC blades servers housed inside multiple chasses. Like Terminal Servers and desktop virtualization, PC blade chasses are deployed as data center infrastructure assets, thus offering better security and easier manageability.

Like Virtual Desktop Computing, PC blades allow each user to interactively connect to a fully-isolated computer (a physical blade PC as opposed to a VM) using a display protocol.

FIG. 3 illustrates a multi-user PC architecture, with three blades 302 mounted in a single chassis 300, with each blade 302 having its own operating system and applications.

While all the aforementioned models aim to deliver the same efficiencies, they do not achieve this objective equally, despite their apparent similarities. Each approach can be shown to suffer from unique drawbacks inherently solved by one of the other models. In effect, an enterprise is likely to build a hybrid system embracing all of the aforementioned models, allowing it to satisfy the complex business computing requirements of its employees.

SUMMARY OF THE INVENTION

Accordingly, the present invention is directed to systems and methods for managing virtual machines in an enterprise network computing environment that substantially obviates one or more of the problems due to limitations and disadvantages of the related art.

An advantage of the present invention is to provide a system for allocating desktop computer environments to users such that virtual computers and blade PCs can be clustered into one or more desktop groups.

Another advantage of the present invention is to provide a management service bus in which desktops and groups are automatically managed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

In following sections, the system and methods of the present invention offer a solution framework applicable to both Virtual Desktop Computing and blade PC systems that will empower these models with enhanced manageability and accessibility features only found with Windows Terminal Server.

This present invention provides a solution framework that enables virtual desktop computers and blade PCs to be managed as "Terminal Server farms". With this solution framework, each virtual computer or blade PC, running a standard Microsoft client operating system like Windows XP or Vista, is effectively managed using Terminal Server-like practices.

Note that even though Microsoft client operating systems like Windows XP and Vista incorporate the Terminal Services component, they are neither considered nor managed as Terminal Servers because they are single-user, not multi-user operating systems. Microsoft purposely built the Terminal Services service into its client operating systems to enable users to seek and obtain "remote assistance" from other users, as well as to allow them access to their own computers from remote locations over standard LAN, WAN, and Internet connections.

The herein proposed solution framework is applicable regardless of the Terminal Services component. In other words, it is equally applicable whether the implemented system chooses to leverage the built-in Terminal Services component (and associated Remote Desktop Protocol) or an alternative component offering its own remote display protocol.

First Embodiment

Functional Desktop Grouping

Figure 1:
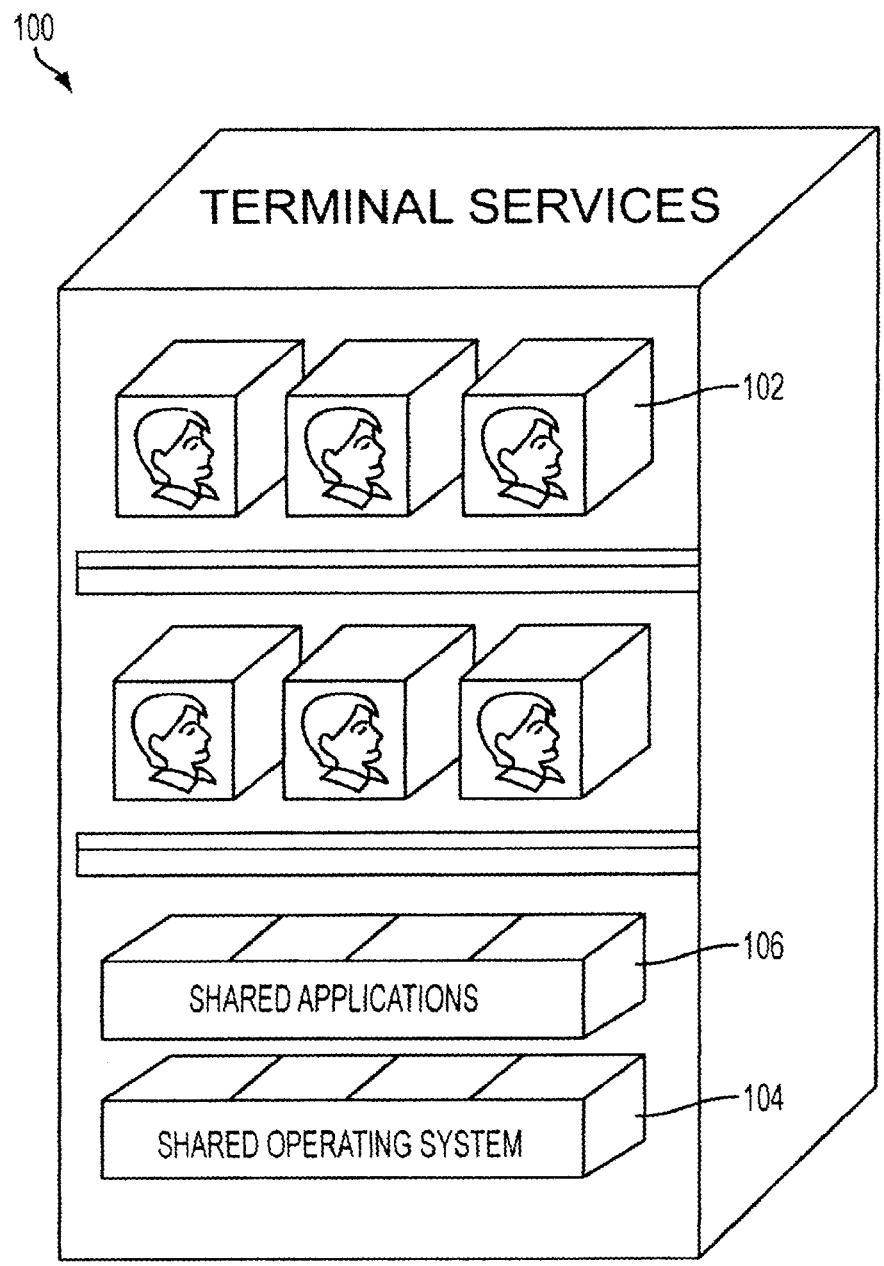
FIG. 1 illustrates the multi-user computing architecture of Terminal Server according to the related art.
Figure 2:
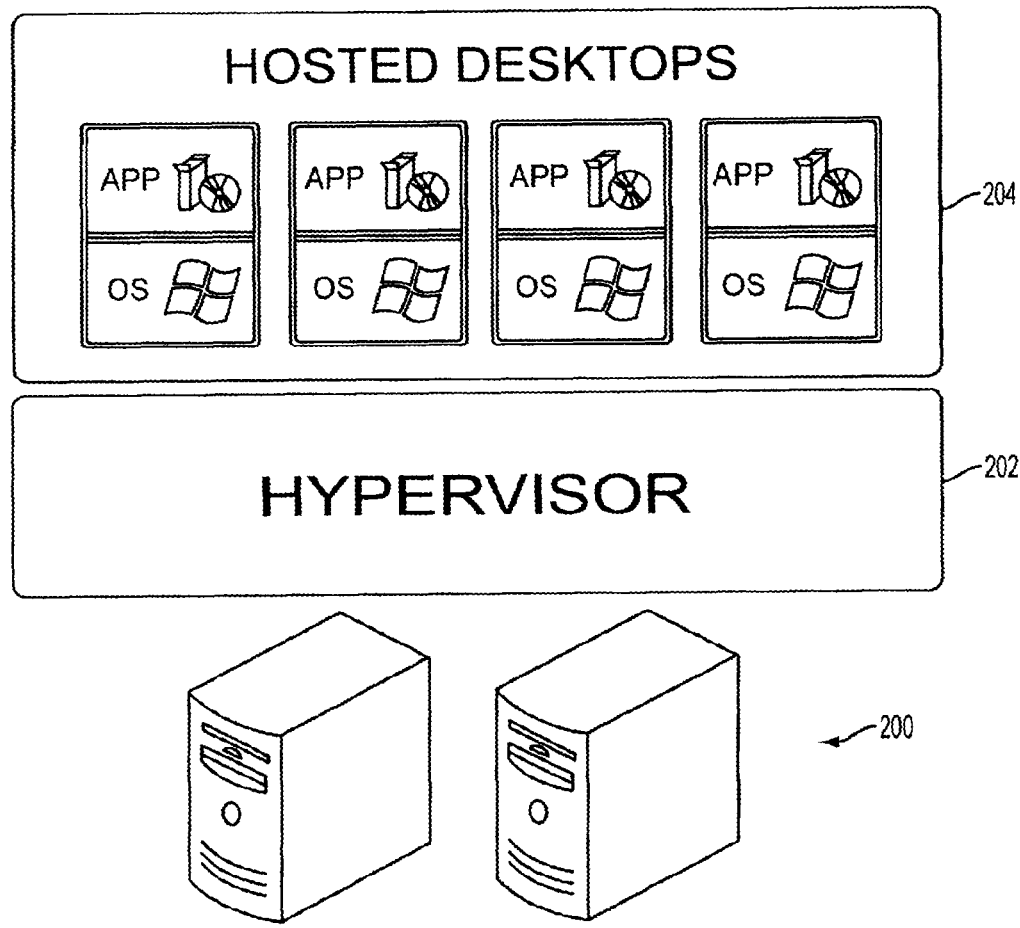
FIG. 2 illustrates the multi-user computing architecture devised using hardware virtualization according to the related art.
Figure 3:
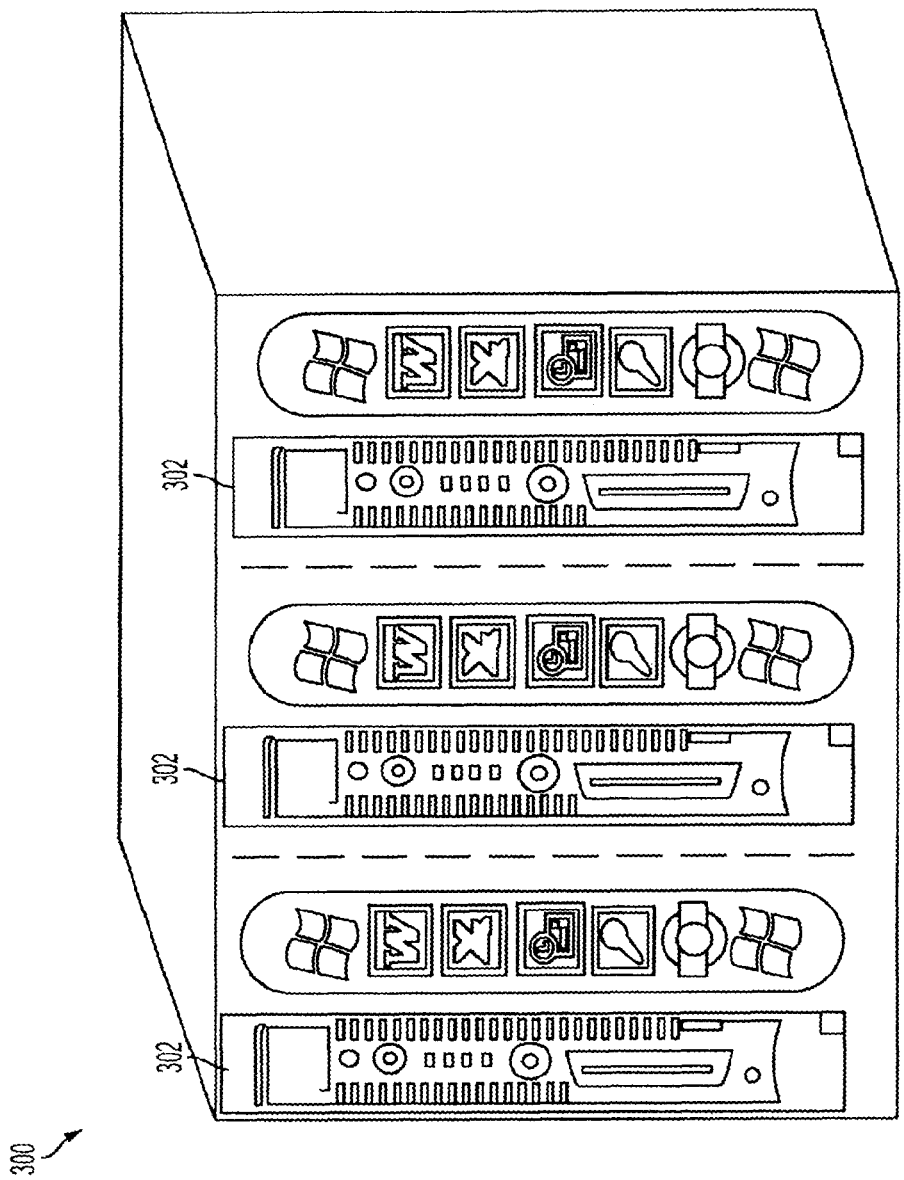
FIG. 3 illustrates the multi-user blade PC architecture according to the related art.
Figure 4:
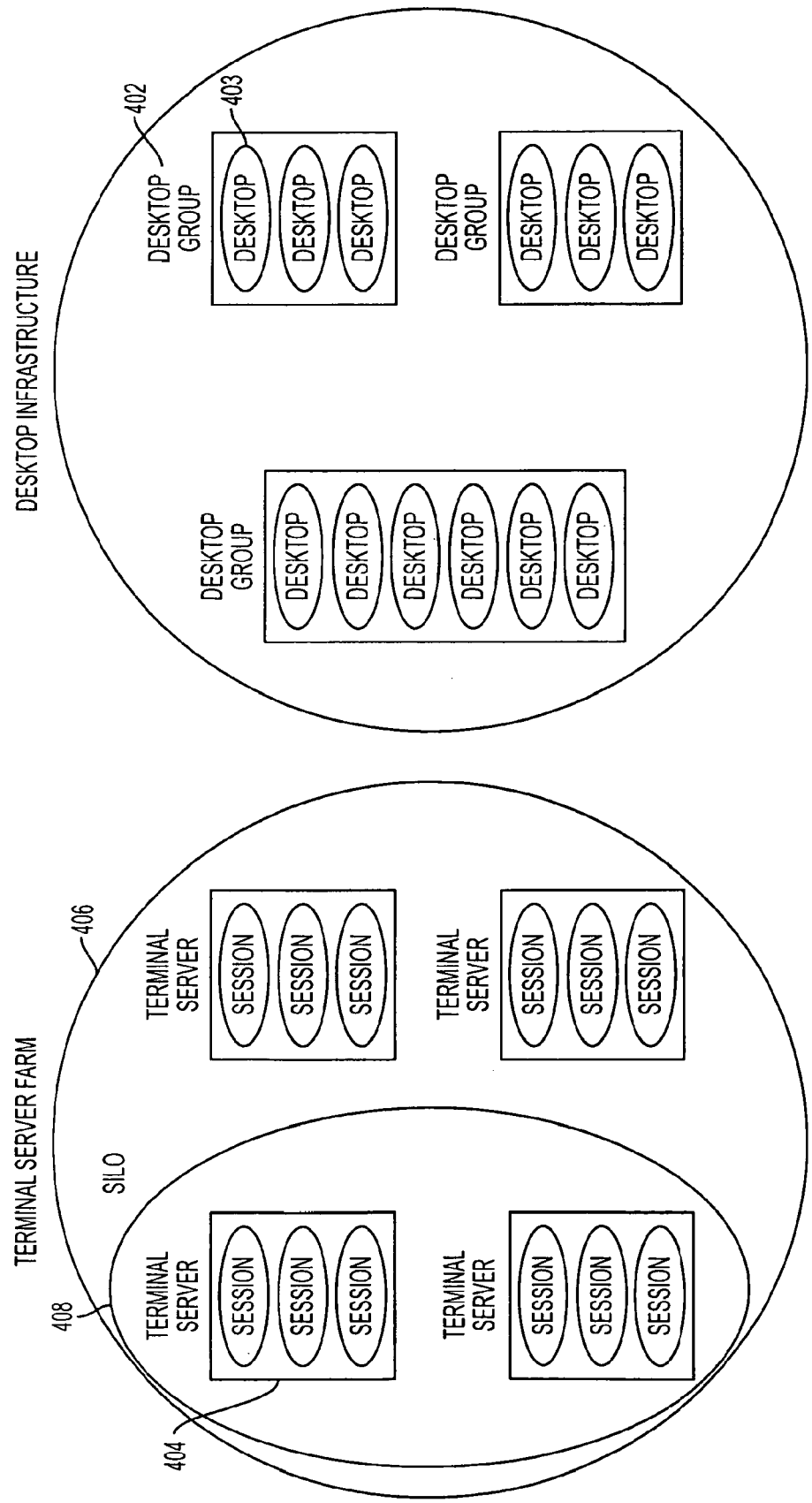
FIG. 4 illustrates a first embodiment of a system according to the present invention.

Virtual computers and blade PCs can be clustered into one or more desktop groups 402, whereby each desktop group 402 is roughly the equivalent of a Terminal Server 404, an entire Terminal Server farm 406, or a Terminal Server silo 408. A silo refers to a subset of servers in the farm sharing a common purpose such as serving a set of special-case applications, or serving the needs of a particular business unit. Just like Terminal Server farms are containers of Terminal Servers which in turn are containers of user sessions, desktop groups 402 are containers of desktop computers 403, where each desktop computer is the equivalent of a Terminal Server user session. FIG. 4 schematically illustrates this desktop grouping model.

Second Embodiment

Management Service Bus: Desktop Management and Brokering

In a second embodiment of the present invention, connection requests from users are received and handled by a purpose-built service often known as the "broker" or "connection manager". This service identifies the specific technical details of the request and redirects the connection to the most suitable desktop. At all times, the broker is apprised of the real-time status of all managed desktops in the infrastructure. This is accomplished by installing an agent service inside each desktop. This service, known as the "data collector" or "managed node agent", is automatically notified by the desktop operating system of all events that occur inside the desktop, including user logon, logoff, and disconnect events. In turn, the data collector relays this event information to the broker, which then records it in the management database.

In addition, and regardless of event occurrence, each data collector periodically sends a heartbeat packet to the broker containing useful state information. Upon receiving this information, the broker records it in the management database. This heartbeat mechanism keeps the broker apprised of the health of all managed desktops in the infrastructure. As such, malfunctioning desktops, from which heartbeats are not received, are eventually marked offline.

Likewise, the broker downloads management information and commands to the data collector as necessary. For example, at the heels of an impending user connection, the broker downloads configuration settings to the data collector according to pre-configured system policies. In response, the data collector applies the received policy settings, grants the user in question access to the desktop, and sends back an acknowledgement to the broker. Upon receiving the acknowledgement, the broker notifies the user to proceed with the desktop connection.

In addition, the broker can query the data collector for any information deemed useful from a management perspective, such as the list of processes currently running inside the desktop (i.e., the applications that the user is currently running). The broker can also command the data collector to execute administrative functions, such as terminating a process, forcibly logging off the user, or shutting down or rebooting the desktop computer.

It is also noteworthy to highlight the importance of this event-driven mechanism with respect to disconnected desktops. For example, upon receiving a disconnect event from an active desktop, the event information is immediately sent to the broker and recorded in the management database. On a subsequent logon request, the broker identifies the user as the previous owner of the disconnected desktop, and will therefore redirect him/her to that disconnected desktop.

Third Embodiment

Policy-Driven Desktop Access

Figure 5:
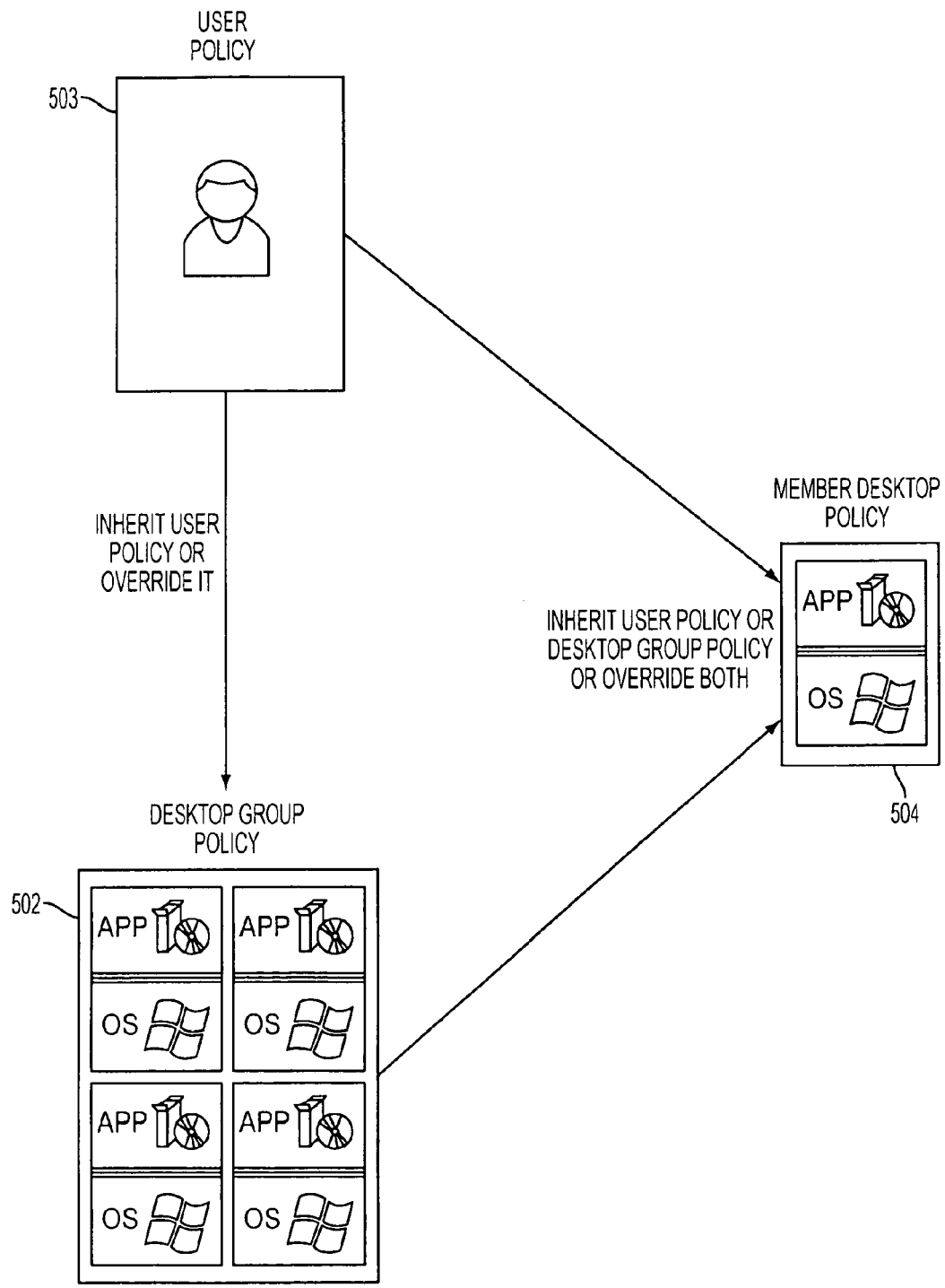
FIG. 5 illustrates a third embodiment of a system according to the present invention.

In a third embodiment of the present invention, end-user access to member desktops of a desktop group may be governed by policy settings (a.k.a. property settings) established at one or more levels. Policy settings can be established at the desktop group level, the individual member desktop level, or the user level. A desktop group 502 may inherit the user-level policy 503 or override it with a group-specific policy. Likewise, an individual desktop 504 may inherit either the group-level policy or the user-level policy, or override them both with a desktop specific policy. FIG. 5 illustrates this policy inheritance model diagrammatically.

Fourth Embodiment

Intelligent Resource Utilization and Power Management ("Green" Computing)

In a fourth embodiment of the present invention, the desktop management framework described herein is ability to control the power state of physical and virtual machines on demand. Most virtualization platforms offer the ability to power on, power off, suspend, and resume the guest virtual machine via published APIs. Likewise, physical machines (blade PCs) offer built-in support for Wake-on-LAN (WoL), allowing the machine to be powered on remotely by sending it a special network packet, and the Windows operating system supports the ability to suspend or hibernate the computer. As such, in order to reduce the power consumption of virtualization hosts and blade PC systems, virtual machines can be suspended or powered off outside normal business hours, and powered back on shortly before the start of a business day. Likewise, in the case of physical machines (blade PCs), they can be programmatically suspended, hibernated, or powered off outside normal business hours, and remotely powered back on using WoL shortly before the start of a business day. If, for a particular reason, a machine is not powered on during business hours, or if the use of a machine is required outside those normal hours, that machine can be powered on instantaneously and on demand upon user request.

Fifth Embodiment

Application and Desktop Publishing

Figure 6:
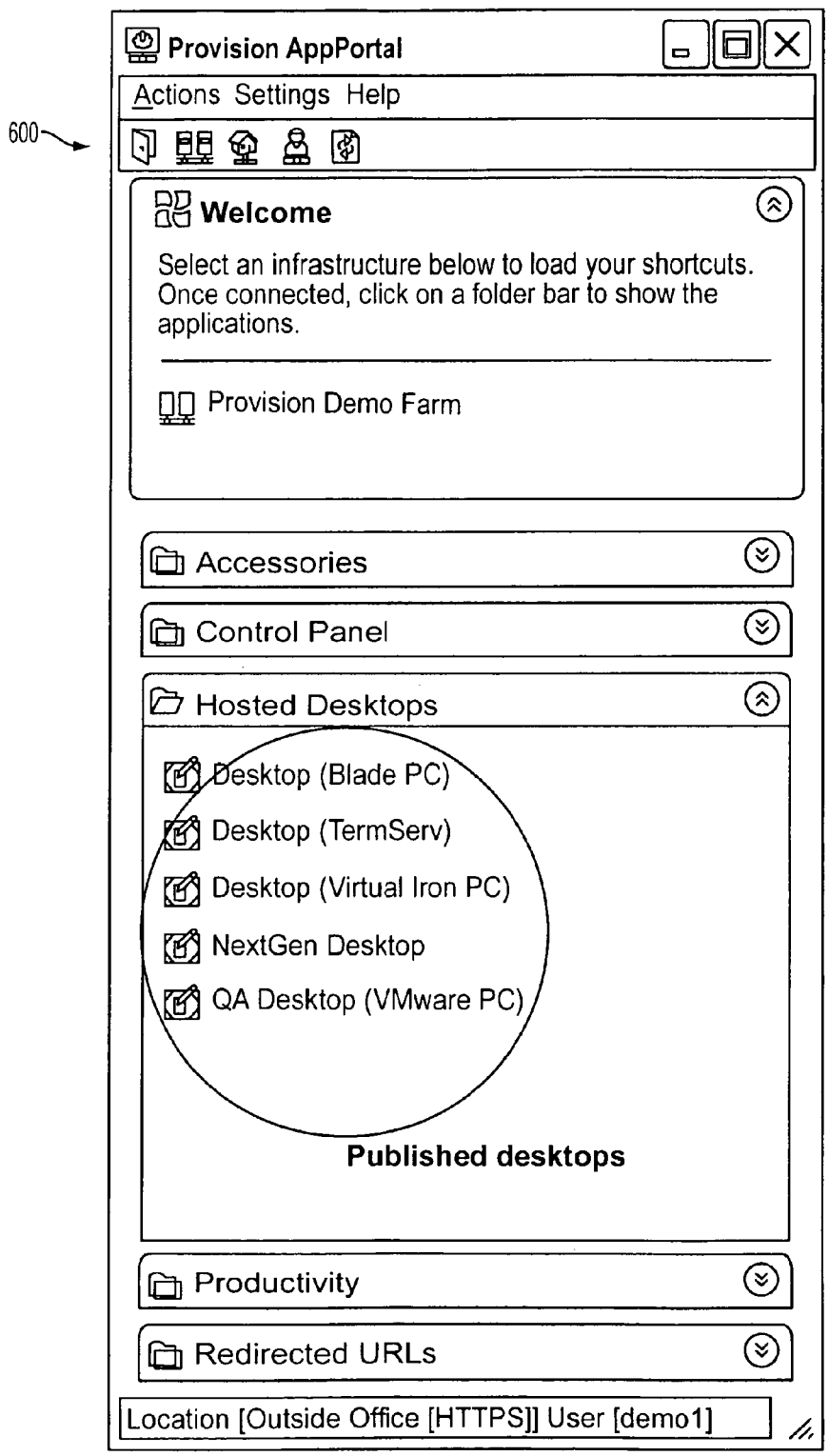
FIGS. 6-8 illustrate a fifth embodiment of a system according to the present invention.
Figure 7:
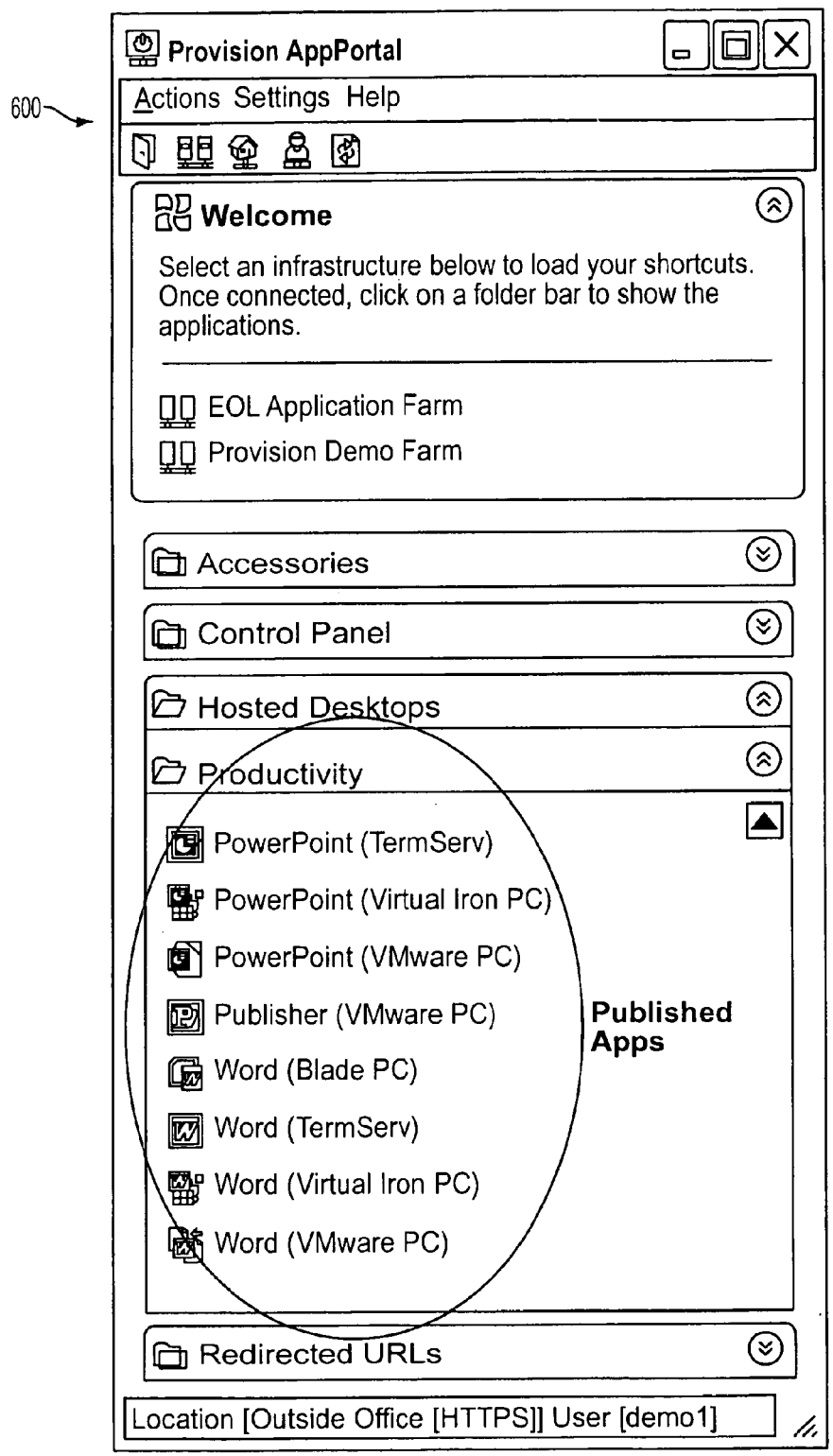
Figure 8:
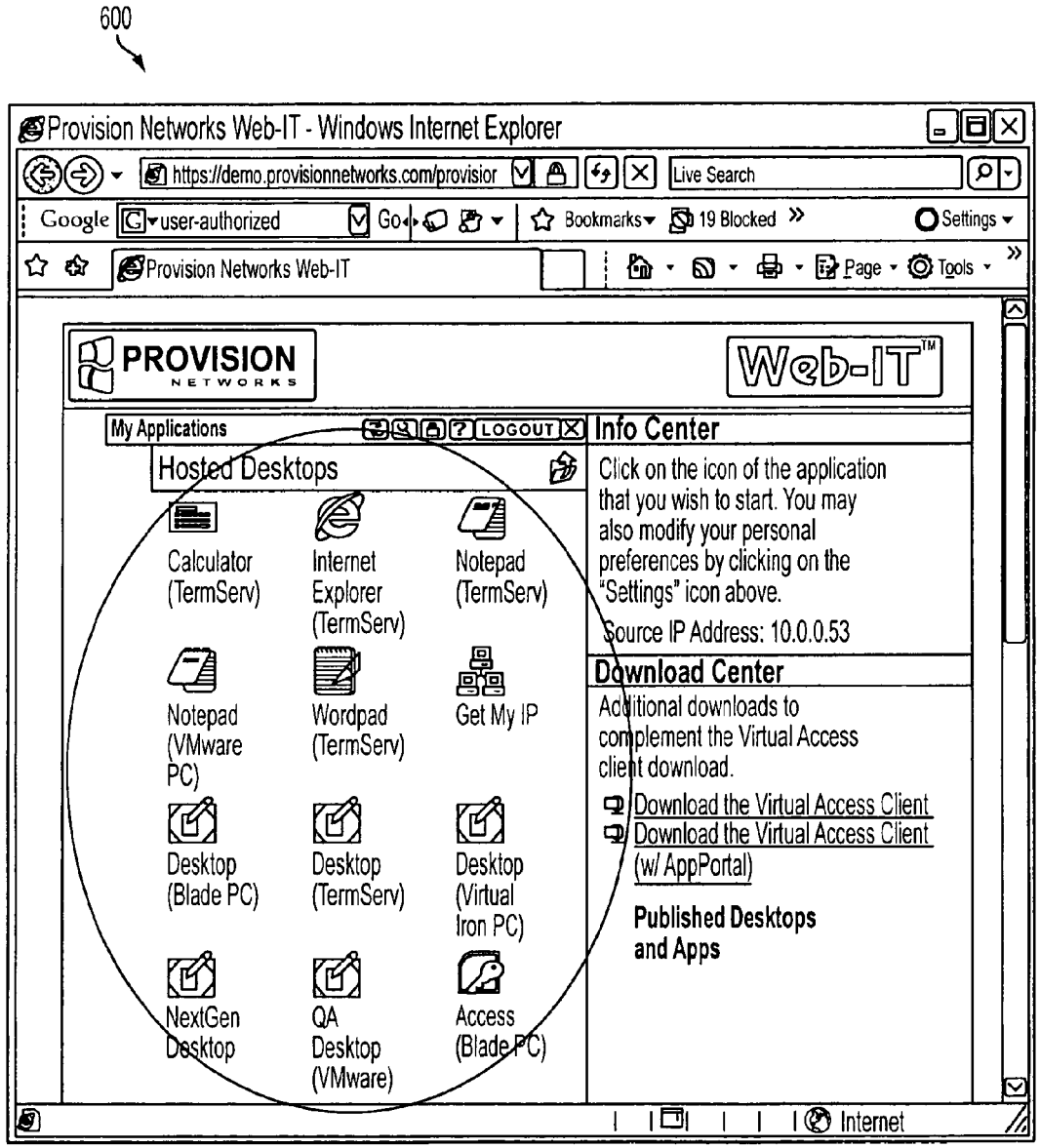

In a fifth embodiment of the present invention, end-users connect to the broker service described earlier and gain authenticated access to a list of named desktops and/or individual applications available from inside the hosted desktops and to which they are authorized access, in order to remotely access virtual and physical desktops hosted inside a data center. These named desktop and application resources are published to the users' end terminal device (i.e., PC, laptop, or thin client), and displayed locally using a Web browser or purpose-built client software 600. Moreover, these resources may be made available to specific users by configuring an access control list (ACL) for each published resource. As such, if a particular named user (or an entity or group of which the user is a member) is specified in the resource's ACL, the user is allowed to access the hosted desktop or application represented by that particular resource. FIGS. 6 through 8 illustrate the application and desktop publishing concept for physical and virtual machines running a standard client operating system.

Sixth Embodiment

Double-Hop and Meet-in-the-Middle SSL VPN Operational Mode

A sixth embodiment of the present invention relates to VPN software and appliances, including SSL-based VPNs. These are often used by organizations to gain secure access to corporate IT assets from remote locations over WAN and Internet connections. However, if the VPN 900 is situated in the DMZ leg 902 of a firewall-protected network, it cannot accommodate the requirement to access hundreds or even thousands of desktops (physical and virtual) situated in the corporate leg of the network without requiring significant network configurations and unwarranted security implications. In other words, the firewall must be configured to allow inbound access to as many hosted desktops as exists in the corporate network. This is not an acceptable practice by most network security standards.

Figure 9:
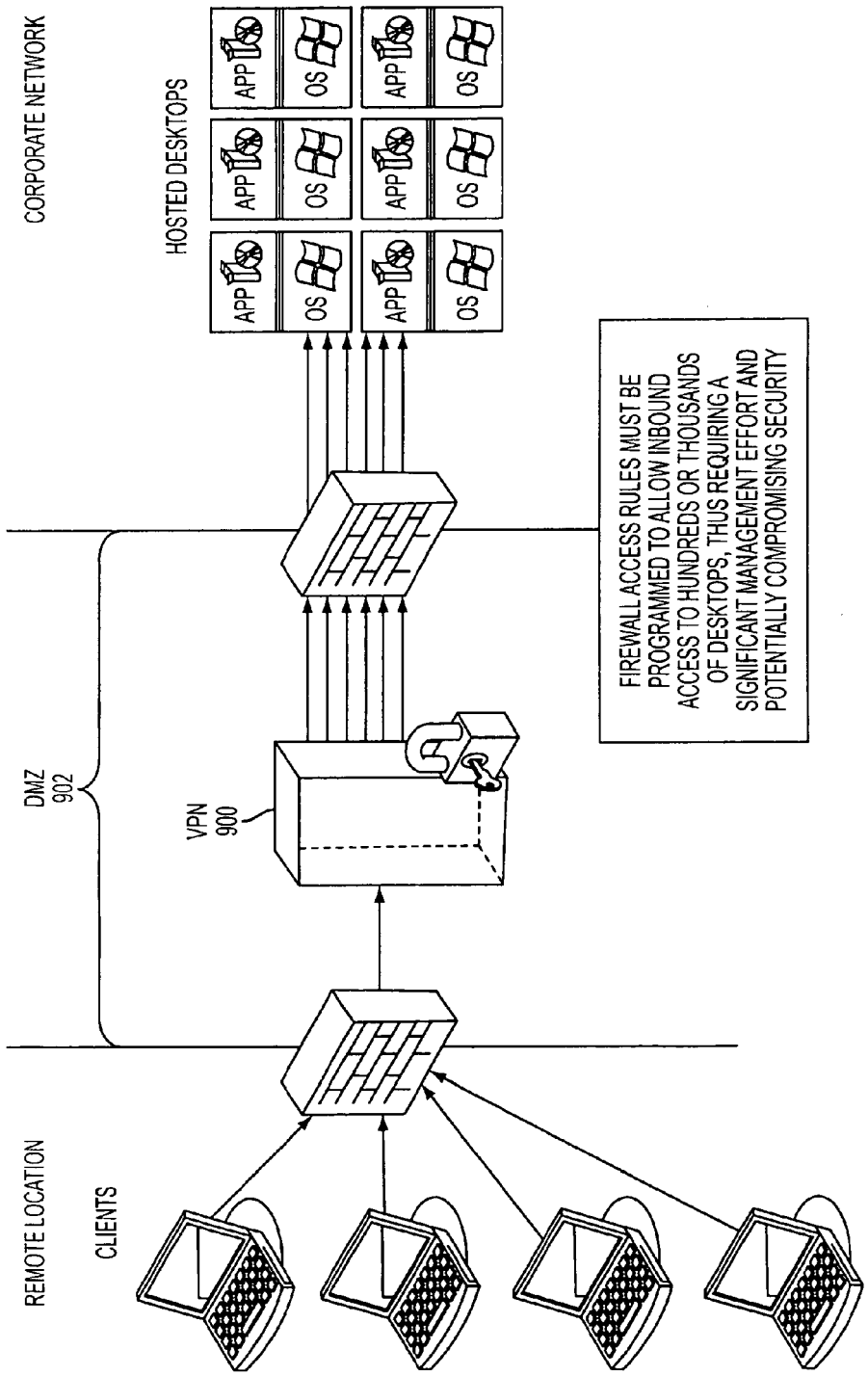
FIG. 9 illustrates firewall management according to the related art.

FIG. 9 illustrates firewall management when accessing a large desktop infrastructure through a DMZ-based VPN according to the related art.

Figure 10:
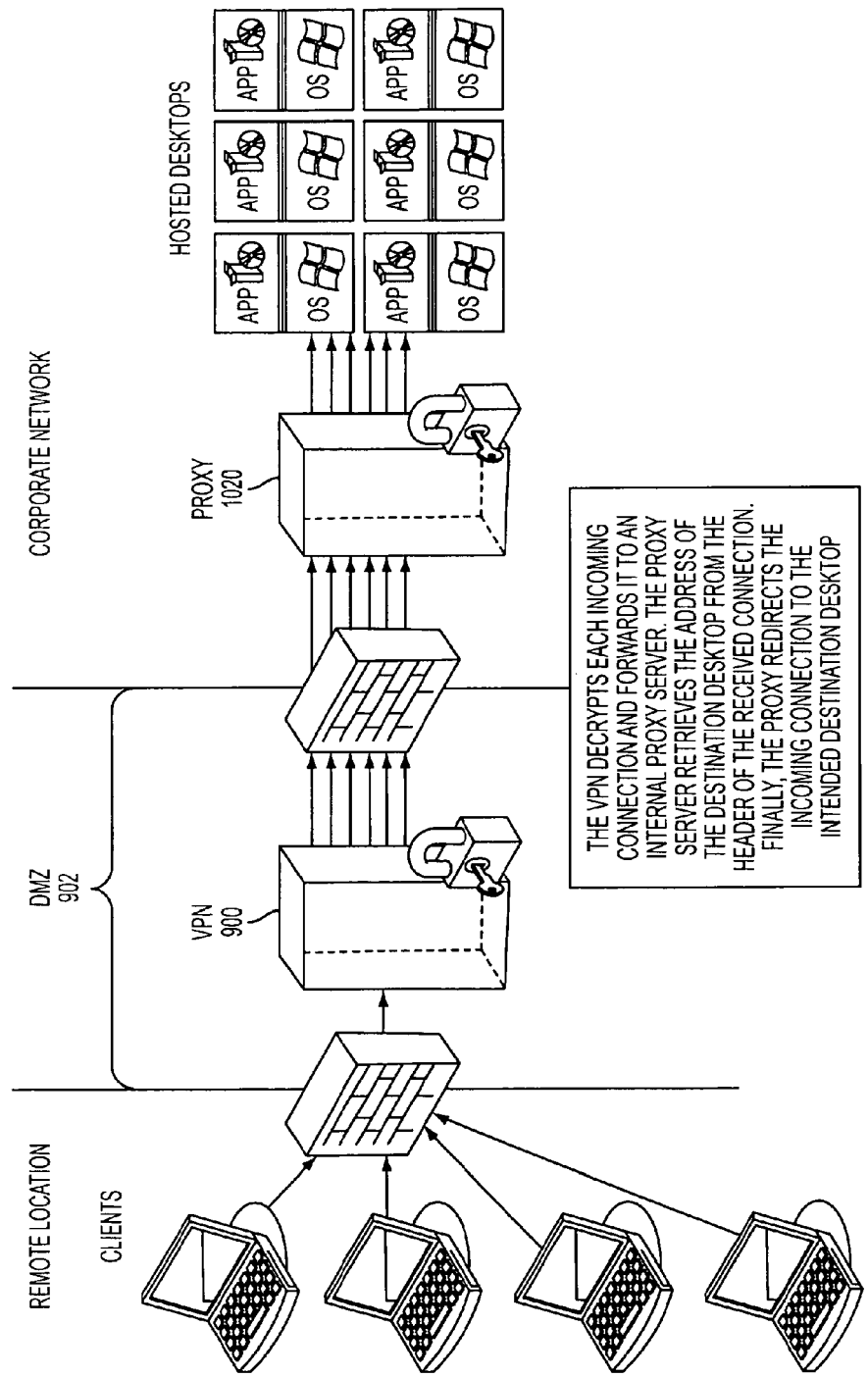
FIG. 10 illustrates firewall management according a first aspect of the sixth embodiment of the present invention.

FIG. 10 illustrates firewall management according to a first aspect of this embodiment of the present invention. Here, the VPN 900 decrypts each incoming connection and forwards it to an internal proxy server 1020. The proxy server retrieves the address of the destination desktop from the header of the received connection. Finally, the proxy redirects the incoming connection to the intended destination desktop.

Figure 11:
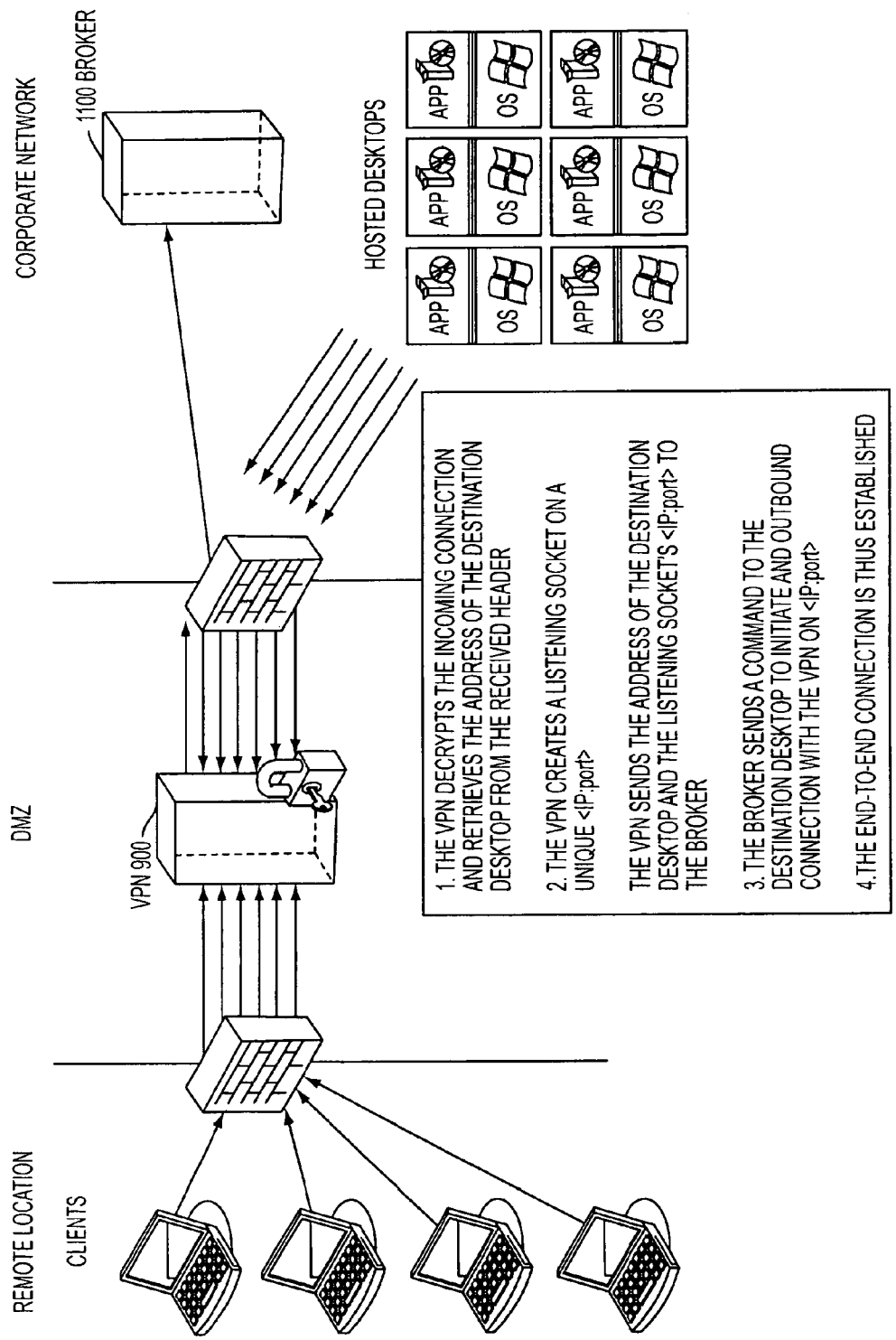
FIG. 11 illustrates firewall management according a first aspect of the sixth embodiment of the present invention.

FIG. 11 illustrates firewall management when accessing a large desktop infrastructure through a DMZ-based VPN according to a second aspect of this embodiment of the present invention. The VPN 900 decrypts each incoming connection and retrieves the address of the destination desktop from the received header. The VPN creates a listening socket on a unique <IP:port>. The VPN sends the address of the destination desktop and the listening socket's <IP:port> to the broker 1100. The broker 1100 sends a command to the destination desktop to initiate an outbound connection with the VPN on <IP:port>. The end-to-end connection is thus established.

The method for starting an arbitrary application on Windows operating systems that are either not running or not capable of running as a multi-user Terminal Server is described herein. These operating systems include Windows XP, Windows Server 2003, and Windows Vista. Unlike a Windows server running as a multi-user Terminal Server, on which an individual application may be remotely started using the Remote Desktop Connection client in lieu of a full desktop, when attempting to do the same on the aforementioned operating systems, they revert to displaying a full desktop session, completely ignoring the user's request to launch a particular application.

A user would configure the Remote Desktop Connection clients to start an arbitrary application on a server running as a multi-user Terminal Server. Upon receiving the client connection, the Terminal Server would process the request to start the specified application to lieu of the Windows desktop shell (the default shell known as "Explorer.exe"). But if the Windows operating system either is not running or is not capable of running as a multi-user Terminal Server, it would simply ignore the request to start a specified application, and would instead start the full desktop. In order to remove this limitation, the following solution is proposed.

The "Shell" value in the Windows registry is modified by specifying a custom shell program, arbitrarily named "Pnstart.exe", in lieu of the default shell program, "Explorer.exe". The "Shell" registry value is found under "HKLM\Software\Microsoft\Windows NT\CurrentVersion\Winlogon", and its factory default is the string value "Explorer.exe". When configured as the default shell, "Explorer.exe" is the program responsible for initializing the Windows desktop environment. As such, replacing "Explorer.exe" with a custom program like "Pnstart.exe" would effectively prevent the Windows desktop shell from starting.

Upon receiving a remote client connection, a logon event is generated, triggering the operating system to automatically start the shell program, i.e., the now newly registered shell program, "Pnstart.exe".

Once started, "Pnstart.exe" awaits a message to be sent to it from the client over a special channel, instructing it to start a desired application. The requested application could be any standard Windows application that a user would normally run on a Windows computer. Subsequent commands may also be sent to Pnstart.exe, instructing it to start additional applications on demand. Ultimately, the user may end up with several concurrently running applications on the same remote Windows machine.

The client may also instruct "Pnstart.exe" to start the Windows desktop shell instead of an arbitrary application. In this case, the client would have to specify "Explorer.exe" as the requested application. To accommodate the request, "Pnstart.exe" would have to temporarily restore the "Shell" registry value to its factory default of "Explorer.exe" before invoking the program itself. Once "Explorer.exe" is started, "Pnstart.exe" would then have to re-establish itself as the shell by writing its binary file name back to the same place in the registry.

The need to temporarily restore the factory default "Shell" value of "Explorer.exe", only to revert again to "Pnstart.exe", allows the Windows desktop to start. Unless the "Shell" value is set to "Explorer.exe" prior to launching the program itself, "Explorer.exe" would only start in "file browser" mode, not "shell" mode. In other words, invoking "Explorer.exe" without it being the registered shell would prevent the Windows desktop from stating.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A computer system, comprises:
a server computer receiving a connection request;
said server parsing said connection request for technical details, said technical details relating to at least one specific application program available on the server;
said server allocating a virtual desktop in response to said connection request, said at least one specific application program being accessible on said virtual desktop;
wherein said virtual desktop is created prior to the server receiving the connection request; and
wherein said virtual desktop is a member of a desktop group, each of said desktops in said desktop group having access to an identical plurality of applications including said at least one specific application program.

2. The system of claim 1, wherein said virtual desktop comprises system resources of the server, including memory, CPU time, and hard drive space.

3. The system of claim 1, wherein said desktop group comprises a predetermined number of virtual desktops corresponding to a predetermined number of users who are authorized to access said plurality of applications.

4. The system of claim 1, wherein said parsing of the connection request on the server is performed by a broker service running on said server, said broker service establishing the connection to the virtual desktop, said broker monitoring the status of said connection, and said broker service freeing the virtual desktop for use by a subsequent user when the connection is closed.

5. The system of claim 1, wherein said desktop group comprises at least one other desktop group, wherein said desktop groups have policy settings determining application access rights, and wherein said desktop group inherits the policy settings of the other desktop group that is contained within it.

6. The system of claim 1, wherein said desktop group considers at least one other desktop group, wherein said desktop groups have policy settings determining application access rights, and wherein said desktop group overrides the policy settings of the other desktop group that is contained within it.

\* \* \* \* \*